United States Patent
Kim et al.

(10) Patent No.: US 11,934,000 B2
(45) Date of Patent: Mar. 19, 2024

(54) LIGHT EMITTING SHEET AND ROAD SIGN USING SAME

(71) Applicant: EZ GROUP INC., Hanam-si (KR)

(72) Inventors: Joo Young Kim, Hanam-si (KR); Ji Won Kang, Seongnam-si (KR); Eun Seong Kim, Hanam-si (KR)

(73) Assignee: EZ GROUP INC., Hanam-si (KR)

( * ) Notice: Subject to any disclaimer, the term of this patent is extended or adjusted under 35 U.S.C. 154(b) by 0 days.

(21) Appl. No.: 18/080,375

(22) Filed: Dec. 13, 2022

(65) Prior Publication Data

US 2023/0115273 A1 Apr. 13, 2023

Related U.S. Application Data

(63) Continuation of application No. PCT/KR2022/013536, filed on Sep. 8, 2022.

(30) Foreign Application Priority Data

Sep. 16, 2021 (KR) .................. 10-2021-0123636

(51) Int. Cl.
*F21V 8/00* (2006.01)

(52) U.S. Cl.
CPC ......... *G02B 6/0051* (2013.01); *G02B 6/0055* (2013.01); *G02B 6/0065* (2013.01)

(58) Field of Classification Search
CPC ... G02B 6/0051; G02B 6/0055; G02B 6/0065
See application file for complete search history.

(56) References Cited

U.S. PATENT DOCUMENTS

| | | | |
|---|---|---|---|
| 2006/0162203 A1* | 7/2006 | Oliver | G02B 6/0043 40/546 |
| 2007/0124970 A1* | 6/2007 | Hjaltason | G09F 13/14 40/546 |
| 2013/0020594 A1* | 1/2013 | Ahn | H01L 33/0093 438/33 |
| 2013/0215646 A1* | 8/2013 | Kusuura | G02B 6/0076 362/613 |
| 2017/0003439 A1* | 1/2017 | Lee | G02B 6/0061 |
| 2018/0033347 A1* | 2/2018 | Myung | G09F 13/22 |

FOREIGN PATENT DOCUMENTS

| | | | |
|---|---|---|---|
| JP | 2015187922 A | | 10/2015 |
| JP | 2015195139 A | * | 11/2015 |
| KR | 101629914 B1 | | 6/2016 |
| KR | 101783391 B1 | | 9/2017 |

(Continued)

OTHER PUBLICATIONS

English translation of Ryuhei JP-2015195139-A, published Nov. 2015 (Year: 2015).*

(Continued)

*Primary Examiner* — Evan P Dzierzynski
(74) *Attorney, Agent, or Firm* — STIP Law Group, LLC (57) ABSTRACT

The light emitting sheet excellent in light guiding performance according to an embodiment of the present disclosure may include: a base film; and a light guide pattern portion in which a pattern set on a surface of the base film is repeatedly formed, wherein the light guide pattern portion has a hexagonal shape.

7 Claims, 6 Drawing Sheets

(56) References Cited

FOREIGN PATENT DOCUMENTS

| KR | 102147411 B1 | 8/2020 | | |
|----|--------------|--------|----|----|
| KR | 102155546 B1 | 9/2020 | | |
| KR | 102295982 B1 | 9/2021 | | |
| KR | 102391807 B1 | 4/2022 | | |
| WO | WO-2014098430 A1 * | 6/2014 | ............. | G02B 6/006 |

OTHER PUBLICATIONS

English Translation of Joo WO 2014098430, published Nov. 2015 (Year: 2015).*
International search report of PCT/KR2022/013536, dated Nov. 29, 2022.

* cited by examiner

LIGHT EMITTING SHEET AND ROAD SIGN USING SAME

CROSS-REFERENCE TO RELATED APPLICATIONS

This application is a continuation of Application No. PCT/KR2022/013536, filed on Sep. 8, 2022, which in turn claims the benefit of Korean Patent Application No. 10-2021-0123636, filed on Sep. 16, 2021, the disclosures of which are incorporated by reference into the present application.

TECHNICAL FIELD

The present invention relates to a light emitting sheet and a road sign using the same, and more particularly, to a light emitting sheet having excellent light guiding performance by including a base film and a pattern formed to improve luminance and illuminance uniformity by uniformly guiding light generated from a light source on a surface of the base film, and a road sign using the light emitting sheet to improve visibility so that a driver may more reliably recognize road information while driving.

BACKGROUND ART

In general, the conventional light emitting sheet widely used for advertising signs, road signs, POPs, window signs, etc. has problems such as requiring a complicated process or requiring expert help during installation, and has difficulty in exhibiting uniform light guiding performance at various angles or environments.

At the same time, in the case of road signs commonly seen on the road, for the safety of the driver, it is necessary to ensure that the driver can clearly recognize the road signs in any environment. However, it is sometimes difficult to identify road signs when driving at night or when driving in various bad weather such as heavy rain, snow, or fog. Accordingly, there is a need to develop a road sign with improved visibility to more reliably deliver road information to drivers at night, in sudden changing weather, or in sections where fog is frequent.

DESCRIPTION OF EMBODIMENTS

Technical Problem

The present invention provides a light emitting sheet that repeatedly forms a pattern set on a base film surface and uniformly guides light emitted from a light source to improve luminance and illuminance uniformity of a light emitting sheet so that characters and figures to be expressed can be seen clearly even from various angles, and a road sign that improves the visibility of road information for a driver so that the driver may more reliably recognize the road information even in situations where it is usually difficult for drivers to identify road signs, such as at night, in heavy snow, in heavy rain and fog, etc. by applying the light emitting sheet together with a separate lighting member and a reflective sheet to improve luminance of a light source.

The technical problems to be achieved by the present invention are not limited to the technical problems mentioned above, and other technical problems that are not mentioned can be clearly understood by one of ordinary skill in the art from the following description.

Technical Solution

A light emitting sheet excellent in light guiding performance according to an embodiment of the present disclosure may include: a base film; and a light guide pattern portion in which a pattern set on a surface of the base film is repeatedly formed, wherein the light guide pattern portion has a hexagonal shape.

The light guide pattern portion according to an embodiment of the present disclosure may include: a pattern center having a circular shape composed of at least one dot located in a center; and a triangular pattern that is bisected based on an imaginary line passing in 1 o'clock, 3 o'clock, 5 o'clock, 7 o'clock, 9 o'clock, and 11 o'clock directions from the center of the pattern center, and is a triangle in which both left and right sides are symmetrical.

The light guide pattern portion according to an embodiment of the present disclosure may form a corner pattern in a shape of a sector having a same size that fills an inside of each corner.

Each corner of the triangular pattern according to an embodiment of the present disclosure may have a rounded shape and/or a pointed shape, and each triangle is formed to have a same size.

The light guide pattern portion according to an embodiment of the present disclosure may be printed on the base film with luminescent ink containing an adhesive to have adhesiveness.

The base film according to an embodiment of the present disclosure may be formed of a plurality of layers, and a material is different for each layer.

A road sign for improving visibility of road information for a driver according to an embodiment of the present disclosure may include: the light emitting sheet; a plate member including a composite plate to support the light emitting sheet on a rear surface of the light emitting sheet; a frame bottom plate formed along an edge of the plate member; a lighting member including at least one modular LED at a lower end of the light emitting sheet to provide light; a first reflective sheet formed on a front surface of the light emitting sheet to improve luminance of a light source; a frame top plate formed in front of the first reflective sheet and formed along an edge of the frame bottom plate so as to be fitted with the frame bottom plate; and a second reflective sheet formed in the frontmost to improve luminance of a light source.

The light emitting sheet according to an embodiment of the present disclosure may be laminated with a separate light guide plate to constitute the road sign.

The first reflective sheet according to an embodiment of the present disclosure may be laminated with a separate light-diffusing polycarbonate to constitute the road sign.

The second reflective sheet according to an embodiment of the present disclosure may be laminated with a separate composite plate to constitute the road sign and comprises sign information indicating road information on a front side.

Advantageous Effects of Disclosure

According to an embodiment of the present invention, a light emitting sheet of the present invention and a road sign using the same may have uniform light guiding performance in various angles and environments by uniformly guiding light generated from a light source through a base film and a hexagonal light guide pattern portion in which a triangular pattern located in a direction set from the center of a circular pattern composed of at least one dot is repeatedly formed on the surface of the base film, thereby improving luminance and illuminance uniformity. In addition, the light emitting sheet may be used as a billboard through an easy and convenient process of cutting the characters and figures to be expressed and attaching them to a transparent material such as acrylic. In addition, by manufacturing a road sign using such a light emitting sheet, visibility may be improved so that a driver may more reliably recognize road information even in situations where the driver's discrimination ability is reduced, such as at night, heavy rain, heavy snow, and fog.

It should be understood that the effects of the present invention are not limited to the above-described effects, and include all effects that can be inferred from the configuration of the invention described in the description or claims of the present invention.

MODE OF DISCLOSURE

Hereinafter, embodiments of the present invention will be described in detail with reference to the accompanying drawings.

The terms used in the specification will be briefly described, and the configuration and operation of a preferred embodiment of the present invention will be described in detail as a detailed description for carrying out the present invention.

General and widely used terms have been employed herein, in consideration of functions provided in the present invention, and may vary according to an intention of one of ordinary skill in the art, a precedent, or emergence of new technologies. In addition, in certain cases, a term which is not commonly used can be selected. In such a case, the meaning of the term will be described in detail at the corresponding portion in the description of the present invention. Therefore, the terms used herein should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, terms such as " . . . unit", " . . . module", or the like described herein refer to units that perform at least one function or operation, and the units may be implemented as hardware or software or as a combination of hardware and software. In addition, throughout the specification, when an element is "connected" to another element, the elements may not only be "directly connected", but may also be "electrically connected" via another element therebetween.

Reference will now be made in detail to embodiments, examples of which are illustrated in the accompanying drawings. In this regard, the present invention may have different forms and should not be construed as being limited to the descriptions set forth herein. In addition, descriptions of well-known functions and constructions will be omitted for clarity and conciseness, and similar reference numerals are assigned to similar elements throughout the specification.

Figure 1:
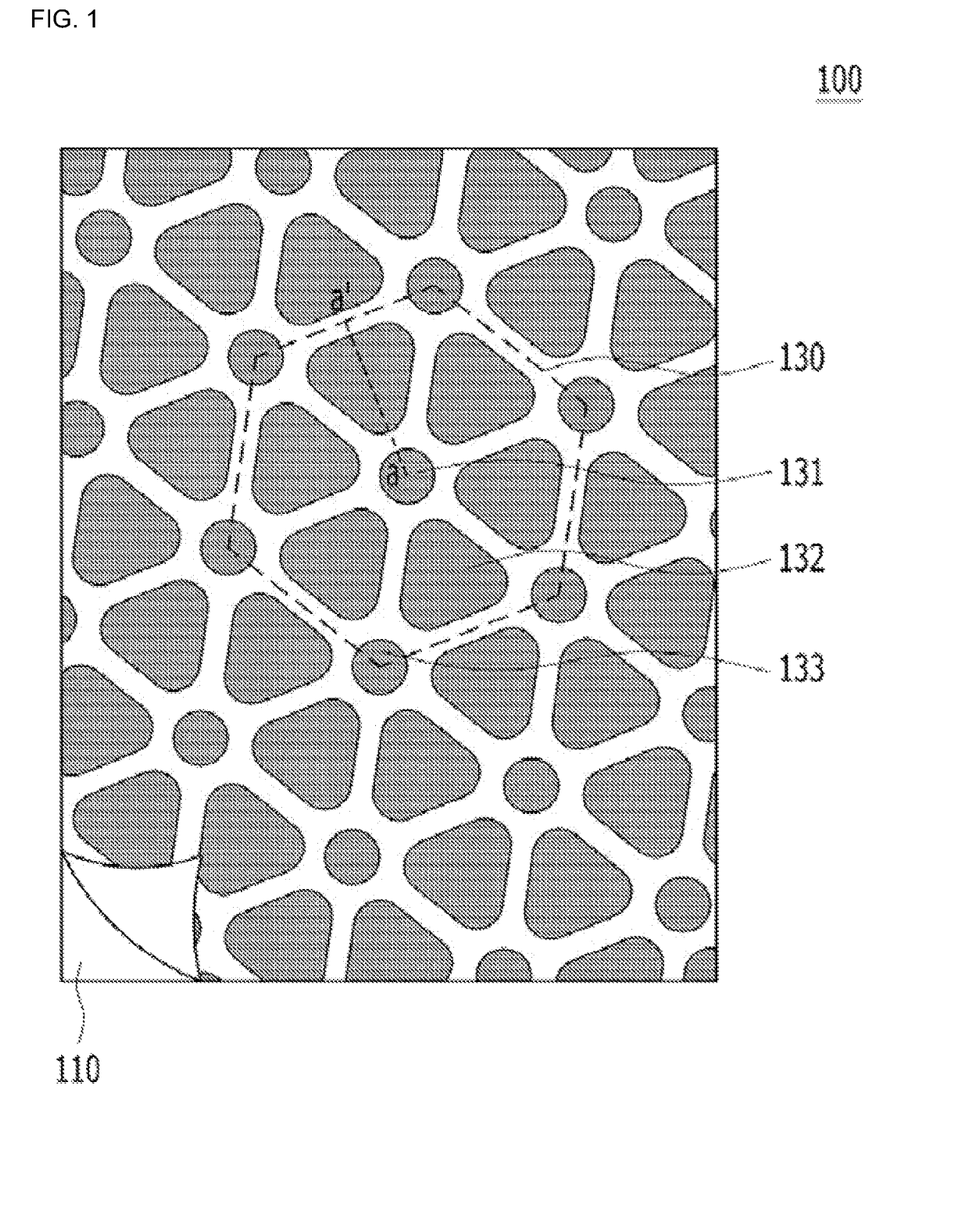
FIG. 1 is an image showing a light emitting sheet according to an embodiment of the present invention.

FIG. 1 is an image showing a light emitting sheet according to an embodiment of the present invention.

Referring to FIG. 1, a light emitting sheet 100 is repeatedly formed in a pattern set on a base film 110 and a surface of the base film 110, and may include a light guide pattern portion 130 having a hexagonal shape. In this case, the base film 110 may be formed of a plurality of layers, and the material may be different for each layer. A material that can be used to form the base film 110 may be polypropylene, polyethylene terephthalate, etc., and depending on the production, the same material may be applied to each layer, a different material may be applied to each layer, or mixed materials may be applied to each layer. In this way, when the base film 110 includes a plurality of layers, it may be laminated and manufactured using a method such as compression and adhesion.

The light guide pattern portion 130 may have a pattern center 131 having a circular shape composed of at least one dot located in the center, and a triangular pattern 132 that is bisected based on an imaginary line (the direction line a-a' shown in FIG. 1 passes is the 11 o'clock direction) passing in the 1 o'clock, 3 o'clock, 5 o'clock, 7 o'clock, 9 o'clock and 11 o'clock directions like the line a-a' shown in FIG. 1 from the center of the pattern center 131 so that both left and right sides are symmetrical. At this time, one edge of the triangular pattern 132 may face the pattern center 131, one side of the triangular pattern 132 may be located to face the hexagonal side of the light guide pattern portion 130, each corner of the triangular pattern 132 may have a rounded shape and/or a pointed shape, and each triangle constituting the light guide pattern portion 130 may be formed to have the same size. In addition, the light guide pattern portion 130 may form a corner pattern 133 in the shape of a sector having the same size that fills the inside of each corner. This corner pattern 133 has an area corresponding to one-third of the pattern center 131 having a circular shape, so that when three light guide pattern portions 130 are gathered to form a pattern, the corner pattern 133 is formed to form a single circle, thereby completing a natural pattern.

In addition, the light guide pattern portion 130 may be printed on the base film 110 with luminescent ink containing an adhesive to have adhesiveness. At this time, because the light guide pattern portion 130 has adhesiveness, in the case of manufacturing a light emitting device using the light emitting sheet 100, there is an advantage that a back sheet and a light transmitting panel may be easily combined. A light emitting component of the composition of the luminescent ink may be composed of ceramic particles such as titanium oxide or glass, which are generally used in a light guide sheet (light emitting sheet), and at least one of various synthetic resins such as acrylic, silicone or urethane-based, vinyl-based, and polysynthetic resins having an adhesive component may be selectively applied.

Figure 3A:
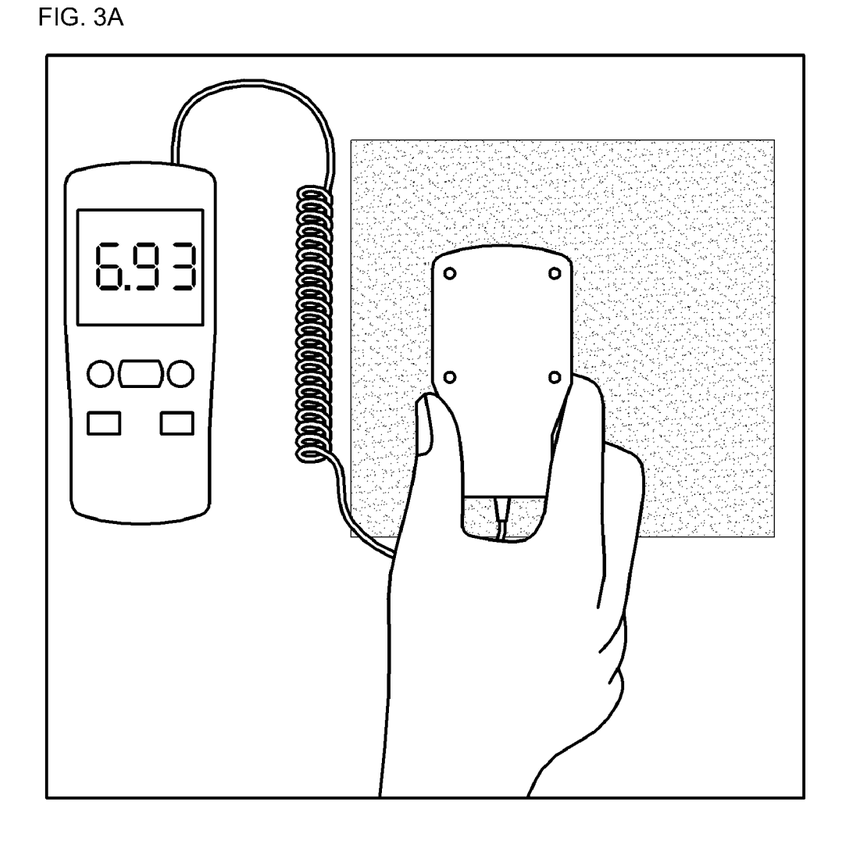
FIGS. 3A and 3B are images showing a comparison test result of illuminance of a light emitting sheet according to an embodiment of the present invention.
Figure 3B:
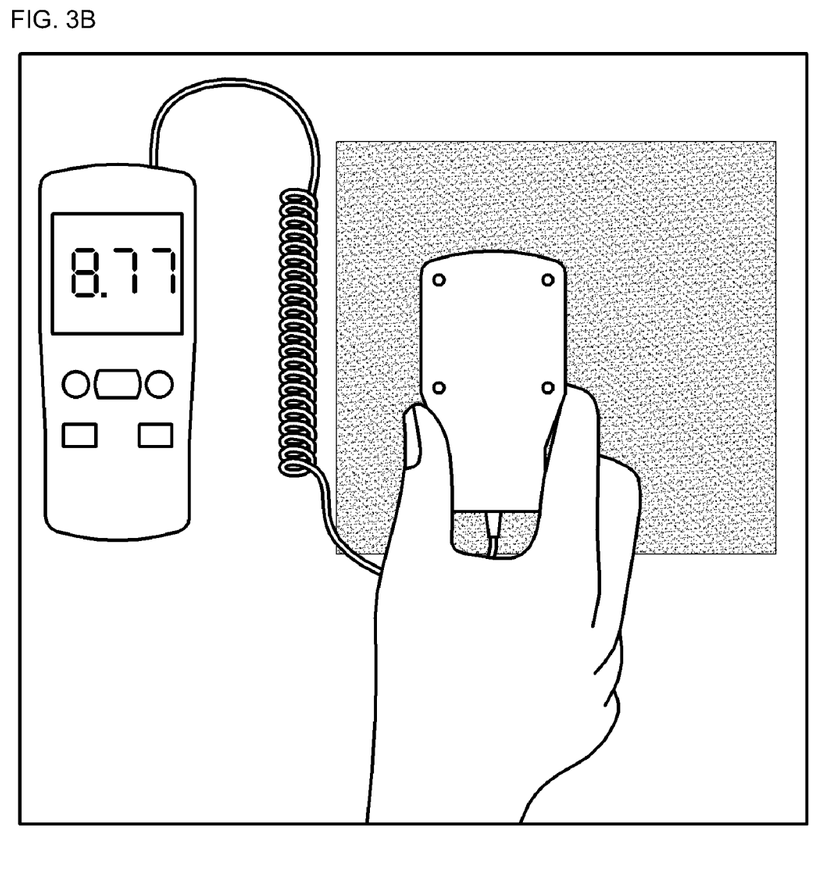

FIGS. 3A and 3B are images showing a comparison test result of illuminance of a light emitting sheet according to an embodiment of the present invention.

Referring to FIGS. 3A and 3B, FIG. 3A is measurement of the illuminance of a light emitting sheet to which a previously developed pattern is applied, and the illuminance is 6930 lux. Similarly, FIG. 3B is measurement of the illuminance of the light emitting sheet 100 according to an embodiment of the present invention, and the illuminance is 8770 lux. In this way, by forming the light guide pattern portion 130 on the surface of the base film 110, the light emitting sheet 100 may uniformly induce light generated from a separate external light source to improve luminance and illuminance uniformity. Accordingly, the light emitting sheet 100 is not only visible from the front, but also has uniform light guiding performance at various angles or in an environment with poor discrimination including dark night, thereby improving discrimination.

In addition, according to another embodiment of the present invention, the light emitting sheet 100 may be used for advertisements and guidance without the help of experts through an easy and convenient process of cutting out characters and figures that a user wants to express and attaching them to a transparent panel such as acrylic.

Figure 4A:
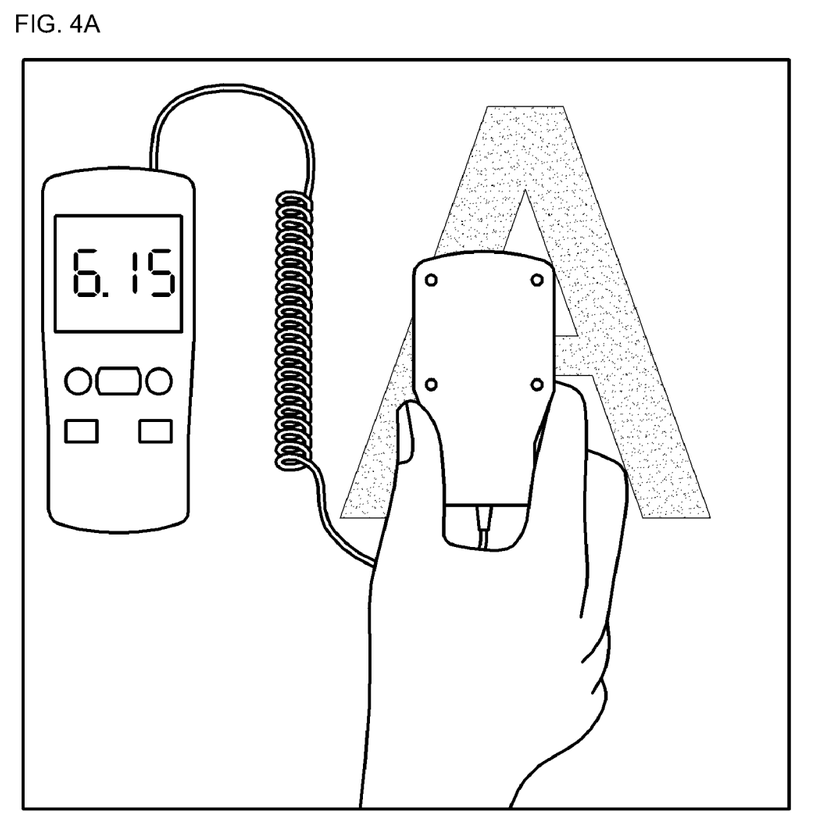
FIGS. 4A and 4B are images showing a comparison test result of illuminance of a light emitting sheet expressing characters by cutting out the light emitting sheet according to another embodiment of the present invention.
Figure 4B:
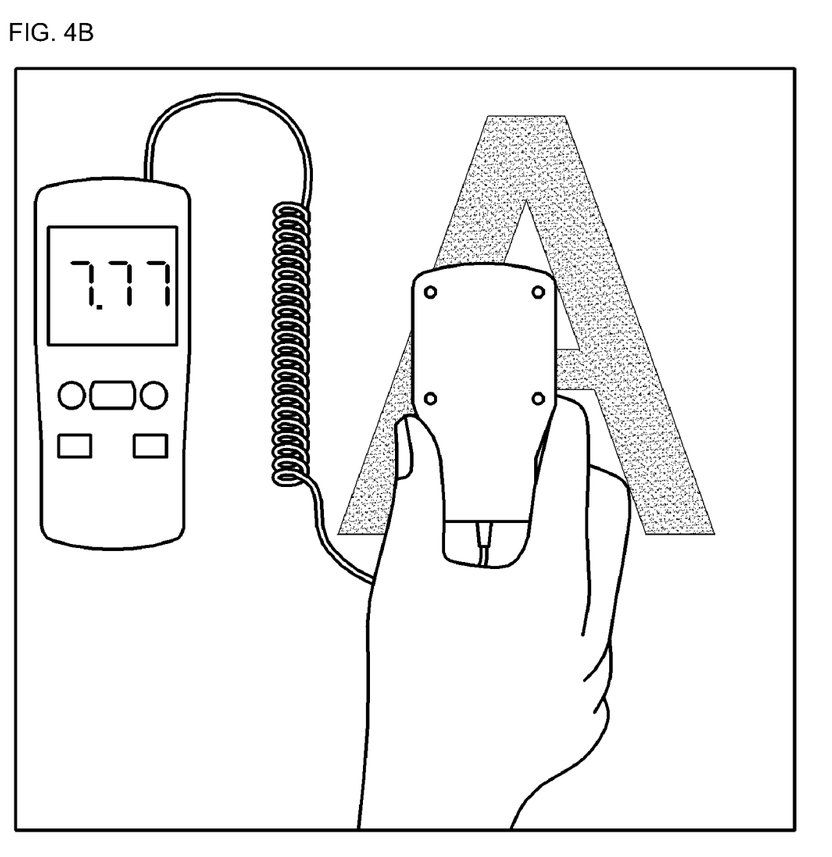

FIGS. 4A and 4B are images showing a comparison test result of illuminance of a light emitting sheet expressing characters by cutting out the light emitting sheet according to another embodiment of the present invention.

FIG. 4A is a result of measuring the illuminance of a light emitting sheet to which a previously developed pattern is applied, which is cut out to express characters, and the illuminance is 6150 lux. Similarly, FIG. 4B is a result of measuring the illuminance of the light emitting sheet 100 according to an embodiment of the present invention, which is cut out to express characters, and the illuminance is 7770 lux. For this test, acrylic specification 590×300×5 (unit: mm) and LED lighting 5630 white are used, and the direction of LED irradiation is 300 mm double-sided irradiation. As with the results of FIGS. 3A and 3B, it can be seen that, when compared to expressing characters using the light emitting sheet to which a previously developed pattern is applied, expressing characters using the light emitting sheet 100 according to an embodiment of the present invention exhibit higher illuminance. Therefore, by using the light emitting sheet 100 according to an embodiment of the present invention, advertisements and information boards with improved visibility may be easily and conveniently manufactured according to the purpose of a user.

Figure 2:
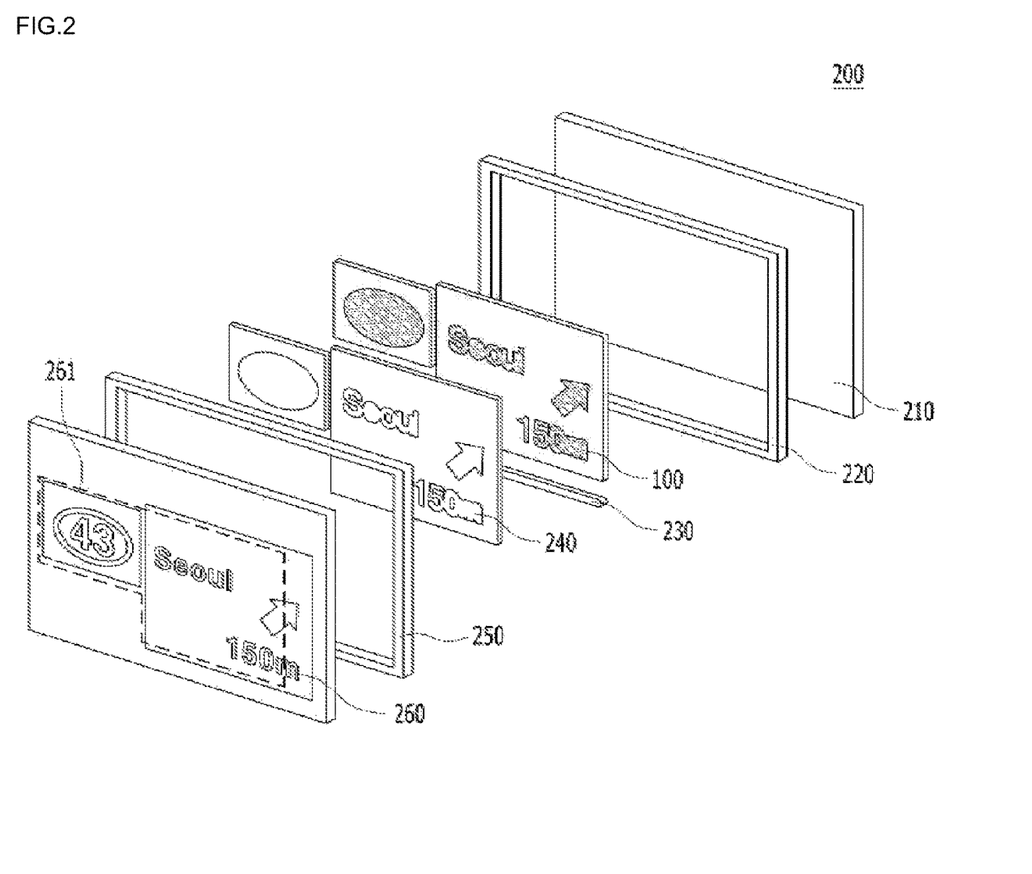
FIG. 2 is an image showing a road sign according to another embodiment of the present invention.

FIG. 2 is an image showing a road sign according to another embodiment of the present invention.

Referring FIG. 2, a road sign 200 may include the light emitting sheet 100 of the present invention described above, a plate member 210 including a composite plate to support the light emitting sheet 100 on a rear surface of the light emitting sheet 100, a frame bottom plate 220 formed along an edge of the plate member 210, a lighting member 230 including at least one modular LED at a lower end of the light emitting sheet 100 to provide light, a first reflective sheet 240 formed on a front surface of the light emitting sheet 100 to improve luminance of a light source, a frame top plate 250 formed in front of the first reflective sheet 240 and formed along an edge of the frame bottom plate 220 so as to be fitted with the frame bottom plate 220, and a second reflective sheet 260 formed in the frontmost to improve luminance of a light source to improve visibility of road information for a driver. At this time, the light emitting sheet 100 may be laminated with a separate light guide plate to constitute the road sign 200, the frame bottom plate 220 may be fitted with the frame top plate 250 in the form of being embedded in a rear surface of the frame top plate 250, and the lighting member 230 may be waterproofed with epoxy.

In addition, the first reflective sheet 240 may be laminated with a separate light-diffusing polycarbonate to constitute the road sign 200, and the second reflective sheet 260 may be laminated with a separate composite plate to constitute the road sign 200 and includes sign information 261 indicating road information on the front side. At this time, the light emitting sheet 100, the first reflective sheet 240, and the second reflective sheet 260 are manufactured to match the shape of the sign information 261 to be expressed. In this way, when the road sign 200 with improved visibility by applying the light emitting sheet 100 is used, even in situations where the driver's discrimination ability is reduced, such as driving at night or in bad weather such as heavy rain, heavy snow and fog, a driver may more reliably recognize road information.

The invention claimed is:

1. A light emitting sheet excellent in light guiding performance, the light emitting sheet comprising:
    a base film (110); and
    a patterned light guide on the base film, wherein a pattern cell (130) is repeatedly formed in the patterned light guide,
    wherein,
    the pattern cell has a hexagonal shape comprising six vertices and six sides,
    the pattern cell comprises:
    a central pattern (131) having a circular shape and located at a center of the pattern cell;
    six isosceles triangular-shaped patterns (132) arranged around the central pattern, wherein a symmetry axis of each of the six isosceles triangular-shaped patterns is aligned perpendicular to a corresponding side of the six sides of the pattern cell and crosses the center of the pattern cell, respectively, wherein each corner of the isosceles triangular-shaped patterns has a rounded shape and/or a pointed shape, and all of the six isosceles triangular-shaped patterns have the same size, and
    six corner patterns (133) located at the vertices of the hexagonal shape, wherein each of the six corner patterns is identical in shape and size to one another, and
    the base film comprises at least one of polypropylene or polyethylene terephthalate.

2. The light emitting sheet of claim 1, wherein the light guide pattern portion is printed on the base film with luminescent ink containing an adhesive to have adhesiveness.

3. The light emitting sheet of claim 1, wherein the base film is formed of a plurality of layers, and a material is different for each layer.

4. A road sign for improving visibility of road information for a driver, the road sign comprising:
    the light emitting sheet of claim 1;
    a plate member including a composite plate to support the light emitting sheet on a rear surface of the light emitting sheet;
    a frame bottom plate formed along an edge of the plate member;
    a lighting member including at least one modular LED at a lower end of the light emitting sheet to provide light;
    a first reflective sheet formed on a front surface of the light emitting sheet to improve luminance of a light source;
    a frame top plate formed in front of the first reflective sheet and formed along an edge of the frame bottom plate so as to be fitted with the frame bottom plate; and
    a second reflective sheet formed in the frontmost to improve luminance of a light source.

5. The road sign of claim 4, wherein the light emitting sheet is laminated with a separate light guide plate to constitute the road sign.

6. The road sign of claim 4, wherein the first reflective sheet is laminated with a separate light-diffusing polycarbonate to constitute the road sign.

7. The road sign of claim 4, wherein the second reflective sheet is laminated with a separate composite plate to constitute the road sign and comprises sign information indicating road information on a front side.

* * * * *